United States Patent
Sudoh

(10) Patent No.: US 7,869,143 B2
(45) Date of Patent: Jan. 11, 2011

(54) IMAGING OPTICAL SYSTEM, CAMERA APPARATUS, AND PERSONAL DIGITAL ASSISTANT

(75) Inventor: Yoshifumi Sudoh, Machida (JP)

(73) Assignee: Ricoh Company, Ltd, Tokyo (JP)

( * ) Notice: Subject to any disclaimer, the term of this patent is extended or adjusted under 35 U.S.C. 154(b) by 0 days.

(21) Appl. No.: 12/485,661

(22) Filed: Jun. 16, 2009

(65) Prior Publication Data
US 2009/0323200 A1 Dec. 31, 2009

(30) Foreign Application Priority Data
Jun. 25, 2008 (JP) .............................. 2008-166043

(51) Int. Cl.
G02B 9/04 (2006.01)
(52) U.S. Cl. .................... 359/793; 359/754; 359/794
(58) Field of Classification Search ......... 359/754–757, 359/759, 760, 763, 764, 767, 769, 771, 772, 359/779, 780, 784, 791–794
See application file for complete search history.

(56) References Cited

U.S. PATENT DOCUMENTS

| | | | |
|---|---|---|---|
| 4,449,793 | A | 5/1984 | Nakamura et al. |
| 7,372,636 | B2 | 5/2008 | Sudoh |
| 7,535,653 | B2 | 5/2009 | Sudoh |
| 2003/0103275 | A1 | 6/2003 | Sato |
| 2008/0218724 | A1 | 9/2008 | Nishina et al. |
| 2008/0278779 | A1 | 11/2008 | Nishina et al. |
| 2009/0067060 | A1 | 3/2009 | Sudoh |
| 2009/0086340 | A1* | 4/2009 | Sato .......................... 359/794 |
| 2009/0122418 | A1 | 5/2009 | Atsuumi |

FOREIGN PATENT DOCUMENTS

| | | | |
|---|---|---|---|
| JP | 63-106714 | A | 5/1988 |
| JP | 3352264 | A | 7/1996 |
| JP | 3607958 | A | 5/1997 |
| JP | 10-142495 | A | 5/1998 |
| JP | 2004-177435 | | 6/2004 |
| JP | 2005-257912 | A | 9/2005 |
| JP | 2005-292344 | | 10/2005 |

OTHER PUBLICATIONS

European Patent Office Communication dated Aug. 19, 2009.

* cited by examiner

*Primary Examiner*—Darryl J Collins
(74) *Attorney, Agent, or Firm*—Dickstein Shapiro LLP

(57) ABSTRACT

An imaging optical system, including a first lens group; an aperture stop; a second lens group having a positive power, the first lens group, the aperture stop and the second lens group being arranged from a side of an object sequentially, wherein the second lens group includes a second front lens group having a positive power and a second rear lens group having a positive power, the second front lens group and the second rear lens group being arranged sequentially from the object side, wherein, when focusing from an infinity-distance object to a short-distance object, the first lens group and the aperture stop are fixed, and the second front lens group and the second rear lens group are moved with a mutually different movement amount.

13 Claims, 10 Drawing Sheets

THE FIRST LENS GROUP

THE SECOND FRONT LENS GROUP

THE SECOND REAR LENS GROUP

FILTER

THE FIRST LENS GROUP

THE SECOND FRONT LENS GROUP

THE SECOND REAR LENS GROUP

FILTER

THE FIRST LENS GROUP
THE SECOND FRONT LENS GROUP
THE SECOND REAR LENS GROUP
FILTER

THE FIRST LENS GROUP
THE SECOND FRONT LENS GROUP
THE SECOND REAR LENS GROUP
FILTER

IMAGING OPTICAL SYSTEM, CAMERA APPARATUS, AND PERSONAL DIGITAL ASSISTANT

CROSS-REFERENCE TO THE RELATED APPLICATION

The present application is based on and claims priority from Japanese Patent Application Number 2008-166043, filed on Jun. 25, 2008, the disclosure of which is hereby incorporated by reference herein in its entirety.

BACKGROUND OF THE INVENTION

1. Field of the Invention

The present invention relates to an imaging optical system, a camera apparatus using the imaging optical system, and a personal digital assistant using the camera apparatus.

2. Description of the Related Art

As digital cameras become widely prevalent, a better exterior form and a high performance are envisaged. In particular, further miniaturization of a camera main body is required for a better exterior form, and a higher image quality, a wider angle and a larger caliber able to correspond to an imaging element exceeding ten million pixels are required for a high performance.

A high image quality in the case of a short-distance object, a capability of micro photographing, and energy-saving properties also are required.

An imaging optical system that moves a plurality of lens groups when "focusing from an infinity-distance object to a short-distance object" is disclosed in, for example, Japanese Patent Publication No. 2005-292344, Japanese Patent Publication No. 2005-257912, Japanese Patent No. 3607958, and Japanese Patent No. 3352264.

A structure in which three lens groups including a lens group fixed at the time of focusing and two focusing lens groups that move for focusing are disposed in an image side, in other words, a side focusing an image of an aperture stop is disclosed in Japanese Patent Publication No. 2005-292344. However, in the structure, an F number is 2.1 or more.

On the other hand, in the imaging optical systems disclosed by Japanese Patent Publication No. 2005-257912, Japanese Patent No. 3607958, and Japanese Patent. No. 3352264, an aperture stop is moved at the time of focusing.

SUMMARY OF THE INVENTION

An object of the present invention is to provide a new type of imaging optical system having a high image quality capable of corresponding to an imaging element exceeding ten million pixels, a wide angle of field of a half-field angle exceeding 38 degrees, a large caliber below F2.1 but a small size, a high performance even for a short-distance object in which a strong driving force is not required for focusing, a camera apparatus using the imaging optical system, and a personal digital assistant using the camera apparatus.

To accomplish the above object, an imaging optical system according to one embodiment of the present invention includes a first lens group, an aperture stop, and a second lens group having a positive power. The first lens group, the aperture stop, and the second lens group are arranged from a side of an object sequentially.

The second lens group includes a second front lens group having a positive power and a second rear lens group having a positive power. The second front lens group and the second rear lens group are arranged sequentially from the object side.

When focusing from an infinity-distance object to a short-distance object, the first lens group and the aperture stop are fixed, and the second front lens group and the second rear lens group are moved with a mutually different movement amount.

DETAILED DESCRIPTION OF THE PREFERRED EMBODIMENTS

Figure 1:
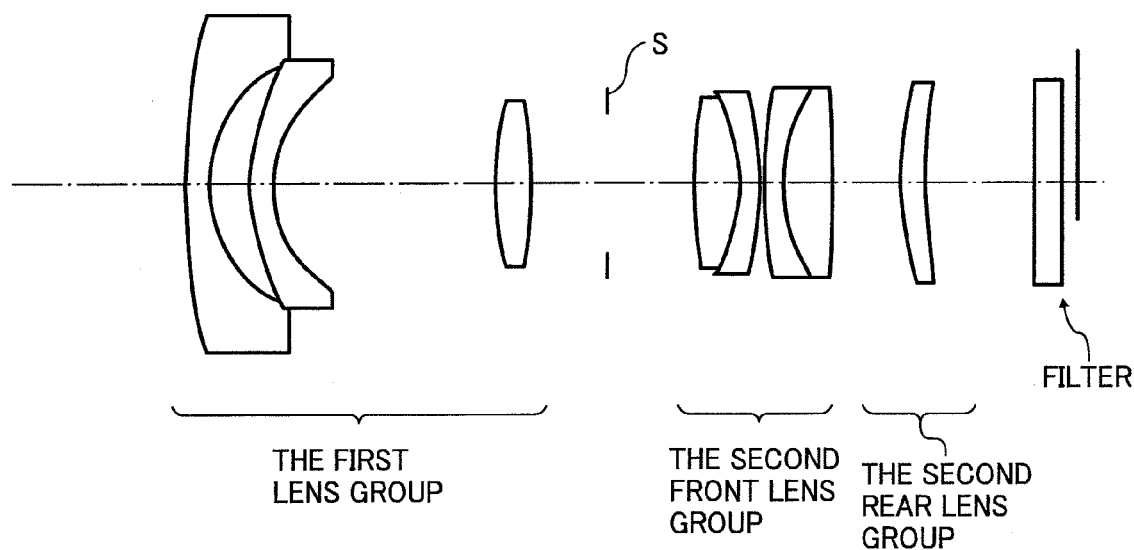
FIG. 1 is an optical arrangement chart of a first embodiment of an imaging optical system according to the present invention.

Preferred embodiments of the present invention will be described in detail hereinafter with reference to the accompanying drawings.

FIGS. 1, 2, 3, 4 illustrate four embodiments of an imaging optical system according to the present invention.

These four embodiments correspond to first, second, third and fourth embodiments which are explained in order hereinafter.

Each of imaging optical systems illustrated in FIGS. 1, 2, 3, 4 includes a first lens group, an aperture stop S, and a second lens group, which are arranged from a side of an object sequentially.

The second lens group includes a second front lens group having a positive power and a second rear lens group having a positive power, which are arranged from the object side sequentially.

When focusing from an infinity-distance object to a short-distance object, the first lens group and the aperture stop are fixed, and the second front lens group and the second rear lens group are moved with a mutually different movement amount.

When focusing from an infinity-distance object to a short-distance object, the second front lens group and the second rear lens group are, moved toward the object side. The first lens group has a positive power.

When focusing from the infinity-distance object to the short-distance object, an interval between the second front lens group and the second rear lens group is augmented.

A positive lens, a negative lens, a negative lens, and a positive lens are arranged from the object side sequentially in the second front lens group. The second rear lens group is composed of "one positive lens". According to the four lenses of the second front lens group, the negative lens and the positive lens on the object side are cemented, and the negative lens and positive lens on the image side are cemented.

In the imaging optical system according to the present invention, when focusing from the infinity-distance object to the short-distance object, it is preferable that the second front lens group and the second rear lens group be moved to the object side.

In the imaging optical system according to the present invention, the following conditional expression is preferably satisfied;

$$0.2 < D\_S2/f < 1.5 \quad (1)$$

wherein D_S2 is an interval between the aperture stop at the time of focusing to infinity and the second lens group.

In the imaging optical system according to the present invention, the following conditional expression is preferably satisfied:

$$0.1 < f2\_a/f2b < 3.0 \quad (2)$$

wherein f2$a$ is a focal length of the second front lens group, and f2$b$ is a focal length of the second rear lens group.

It is preferable that the first lens group have a positive power in the imaging optical system according to the present invention. In the case of the first lens group having the positive power, the following conditional expression is preferably satisfied:

$$0.1 < f2a/f1 < 3.0 \quad (3)$$

wherein f1 is a focal length of the first lens group, and f2$a$ is a focal length of the second front lens group.

It is preferable that an interval between the second front lens group and the second rear lens group be increased in the imaging optical system according to the present invention. In the case of focusing from an infinity-distance object to a short-distance object, the following conditional expression is preferably satisfied:

$$0.05 < D2\_b/D2\_a < 0.7 \quad (4)$$

wherein D2_$a$ is a movement amount of the second front lens group at the time of focusing from an infinity-distance object to the object remote from a lens of the object side by a distance of (100×f/Y') mm, and D2_$b$ is a movement amount of the second rear lens group.

Here, in the conditional expression (4), Y' is a highest image, and f is a focal length of the entire system.

The second front lens group of the imaging optical system according to the present invention is able to be arranged from an object side sequentially in the order of positive lens, negative lens, negative lens, positive lens.

The second rear lens group of the imaging optical system according to the present invention can be constituted by one positive lens.

A camera apparatus according to the present invention includes any one of the imaging optical systems as mentioned above.

The camera apparatus has an imaging element to take a photographic image by the imaging optical system, and a function of converting a photographic image to digital information. The camera may be a digital camera.

A personal digital assistant according to the present invention has the aforementioned camera apparatus.

Compared with an entire extension method in which it is required to move a large-sized front-cell when performing the focusing, and thus a larger driving mechanism and a great driving energy are necessary, a rear focus method which is capable of performing focusing with low energy by a small-sized driving mechanism due to extension amount of the focusing lens group is small, becomes widely prevalent.

There is a problem in that the field tilts due to focusing in the rear focusing method. In particular, more of a large caliber of the imaging optical system, and an influence on a picture by the field tilt is stronger. In the case of the entire lens groups focusing as one with a single focusing group, image degradation is highly noticeable at the time of focusing on a short-distance object.

That is, an object has to be solved in the rear focusing method.

In the imaging optical system according to the present invention for solving the object, the second lens group as a focusing lens group is disposed at the image side than the aperture stop, and has the second front lens group having a positive refractive power and the second rear lens group having a positive refractive power from a side of an object sequentially. As a result of the second front lens group and the second rear lens group being moved with a mutually different movement amount at the time of focusing from an infinity-distance object to a short-distance object, a degradation of a spherical aberration and a coma aberration will be restrained, and the field tilt is able to be restrained at the same time.

Otherwise, the first lens group and the aperture stop are fixed at the time of focusing, and as the result of being fixed, a strong driving force is not required.

The second front lens group and the second rear lens group are moved to the object side together at the time of focusing from an infinity-distance object to a short-distance object.

Efficient focusing is able to be accomplished by moving the second front lens group and the second rear lens group having a positive refractive power to the object side together. A degradation of a spherical aberration and a coma aberration, and the field tilt will be restrained easily by moving the second front lens group and the second rear lens group at a state of maintaining balance.

Conditional expression (1) ensures a higher performance in the case of a short-distance object.

In the case of a value lesser than the lower limit value in conditional expression (1), an interval between the aperture stop and the second front lens group becomes extremely small, the displacement amount of the second front lens group toward the aperture stop is unable to augment, therefore, focusing at the second rear lens group is augmented, and it is difficult to restrain the degradation of a spherical aberration and a coma aberration, and the field tilt.

In the case of a value more than the upper limit value in conditional expression (1), an interval between the aperture stop and the second front lens group is augmented, the light out of the optical axis which passes the second front lens group is increased, and it is difficult to amend the aberration out of an optical axis.

It is further desirable for a conditional expression with a narrower range than conditional expression (1) using the parameters thereof:

$$0.3 < D\_S2/f < 1.0 \tag{1'}$$

Conditional expression (2) ensures a further higher performance in the case of a short-distance object.

In the case of a value more than the upper limit value in conditional expression (2), the positive power of the second rear lens group is much stronger than the positive power of the second front lens group comparatively, and the movement of the second front lens group makes almost no contribution to focusing. Therefore, since the focusing movement amount of the second rear lens group becomes extremely large, it is difficult to restrain the degradation of a spherical aberration and a coma aberration of a short-distance object, and the field tilt.

In the case of a value lesser than the lower limit value in conditional expression (2), since the positive power of the second front lens group is much stronger than the positive power of the second rear lens group comparatively, it is difficult to the amend spherical aberration and the coma aberration, etc.

It is further desirable for a conditional expression with a narrower range than conditional expression (2) using the parameters thereof:

$$0.3 < f2a/f2b < 2.0 \tag{2'}$$

The first lens group has a positive power preferably.

The object of the present invention is capable of being solved whether the first lens group has a positive power or a negative power. In the case of the first lens group having a negative power, the degradation of the spherical aberration becomes more serious.

Conditional expression (3) ensures a higher performance in the case of the first lens group having a positive power.

In the case of a value lesser than the lower limit value in conditional expression (3), since the power of the second front lens group is much stronger than the positive power of the first lens group comparatively, the degradation of the spherical aberration becomes serious by the movement of the second front lens group at the time of focusing.

In the case of a value more than the upper limit value in conditional expression (3), since the positive power of the first lens group is much stronger than the power of the second front lens group comparatively, it is difficult to amend aberration on or out of the optical axis.

It is further desirable for a conditional expression with a narrower range than conditional expression (3) using the parameters thereof:

$$0.2 < f2a/f1 < 2.5 \tag{3'}$$

It is desirable to increase an interval between the second front lens group and the second rear lens group with focusing by the movement of the second front lens group and the second rear lens group at the time of focusing from an infinity-distance object to a short-distance object.

The field tilted in the case of focusing with a same movement amount of the second front lens group and the second rear lens group. The field tilt is able to be restrained in case of focusing by an interval between the second front lens group and the second rear lens group increases.

Conditional expression (4) ensures a higher performance in the case of focusing by an interval between the second front lens group and the second rear lens group increases.

In the case of a value lesser than the lower limit value in conditional expression (4), the effect of focusing at the second front lens group becomes larger, and the spherical aberration becomes serious.

In the case of a value more than the upper limit value in conditional expression (4), it is difficult to amend the field tilt in the case of a short-distance object.

It is further desirable for a conditional expression with a narrower range than conditional expression (4) using the parameter thereof:

$$0.05 < D2\_b/D2\_a < 0.5 \tag{4'}$$

It is preferable that the second front lens group be arranged from an object side sequentially in an order of a positive lens, a negative lens, a negative lens, and a positive lens.

Since the aperture stop is near to the second front lens group, thus the light beam is rough. In the case of the imaging optical system having a larger caliber, the light beam becomes more rough, for amending a spherical aberration and a coma aberration sufficiently, a quality lens is required, and aberration can be amended by a composition of a positive lens, a negative lens, a negative lens, and a positive lens.

In the case of the composition of a positive lens, a negative lens, a negative lens, and a positive lens, it is preferable that the two lenses on the object side and the two lenses on the image side be formed as a cemented lens respectively. And it is preferable that the second front lens group be non-aspherical, therefore, it is capable of restraining an aberration by the movement at the time of focusing.

The second rear lens group can be composed of one positive lens.

Due to off-axis light passes though a position higher than the optical axis, thus if the second rear lens group includes a plurality of lenses, it leads to a large-sized imaging optical system. The signal positive lens constitutes the second rear lens group can have an aspherical, surface with lower positive power toward circumference.

Moreover, as illustrated in the following examples, conditions of (1) to (4), and (1') to (4') are satisfied.

FIG. 17 is used to illustrate an example of a "personal digital assistant". FIG. 17 shows views illustrating an exterior form of a digital camera.

Figure 17A:
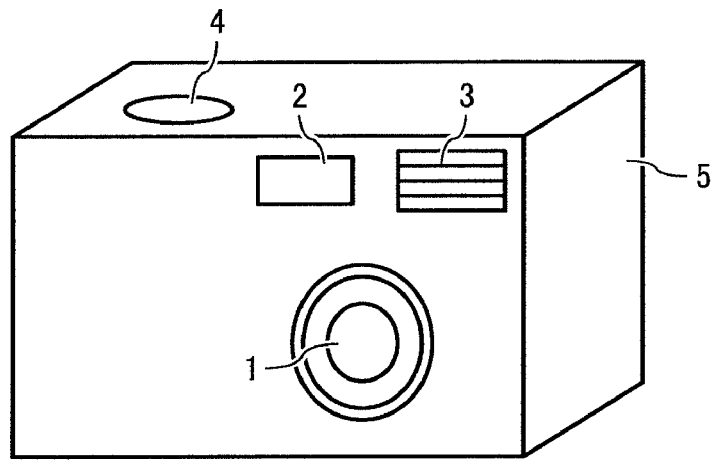
FIG. 17A and FIG. 17B are views showing an embodiment of a personal digital assistant.
Figure 17B:
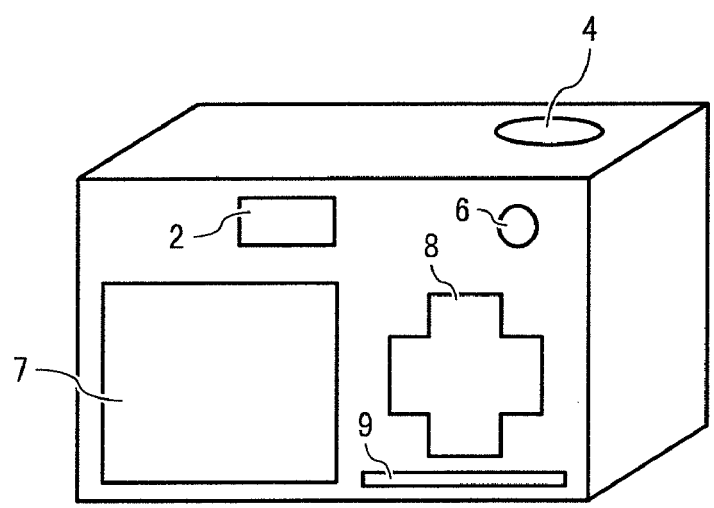

FIG. 17A illustrates a front side view and an upper surface view, and FIG. 17B illustrates a back side view. The apparatus includes the imaging optical systems according to the present invention as an imaging lens 1.

Figure 18:
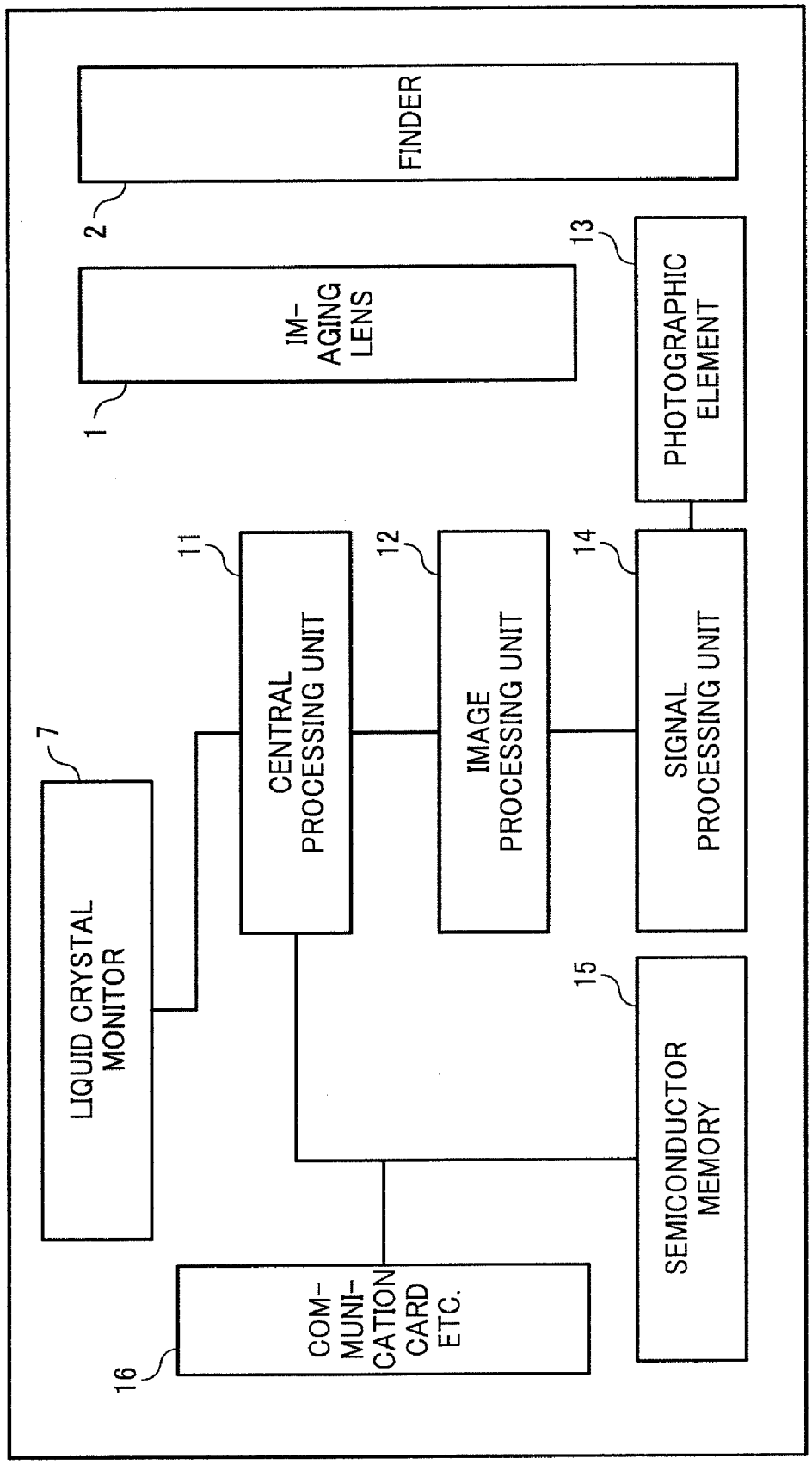
FIG. 18 is a block chart of an example of a system construction of the personal digital assistant in FIG. 17.

FIG. 18 illustrates the "system composition" of a personal digital assistant.

As illustrated in FIG. 18, the apparatus includes an imaging lens 1 and an imaging element 13, and constituted to read out an "image of imaging object" formed by the imaging lens 1 by the imaging element 13, and a signal process apparatus 14 controlled by a center operation apparatus processes an output from the imaging element 13, and converts it to digital information.

The apparatus has "a function of converting a photographic image to digital information".

Next, detailed examples of the imaging optical system are illustrated.

The meaning of the symbols is as follows:
f: Focal length of the entire system;
F: F number;
ω: Half-field angle;
Y': Highest image;
R: Curvature radius;
D: Surface separation;
N: Refractive index (d line);
ν: Abbe number (d line);
K: Asphere conic constant;
A4: 4th asphere coefficient;
A6: 6th asphere coefficient;
A8: 8th asphere coefficient;
A10: 10th asphere coefficient;

The following conditional expression specifies asphere shape by C, K, A4, A6, ... and so on, $$X = CH^2/[1+\sqrt{(1-(1+K)C^2H^2)}] + A^4 \cdot H^4 + A^6 \cdot H^6 + A^8 \cdot H^8 + A^{10} \cdot H^{10}$$

wherein X is a depth on the direction of the optical axis, H is a height from the optical axis, C is a reciprocal of the radius of paraxial curvature (paraxial curvature), K is the conic constant, A4, A6, ... are asphere coefficients.

Example 1

FIG. 1 illustrates a lens constitution of Example 1. The illustrated lens constitution is focusing at infinity and is the same as in FIGS. 2, 3 and 4.

f=5.99; F=1.99; ω=39.3; Y'=4.8

The data of Example 1 is illustrated in Table 1

TABLE 1

|   | R | D | N | ν | glass |
|---|---|---|---|---|---|
| 1 | 35.082 | 1.20 | 1.43875 | 94.94 | SFPL53(OHARA) |
| 2 | 6.700 | 2.00 | | | |
| 3 | 11.715 | 1.20 | 1.51633 | 64.06 | LBSL7(OHARA) |
| 4* | 5.000 | 10.95 | | | |
| 5 | 17.371 | 1.65 | 1.69350 | 53.18 | LLAL13(OHARA) |
| 6* | −33.957 | 3.81 | | | |
| 7 | 0.000 | variable (A) | | | |
| 8 | 27.431 | 2.24 | 1.43875 | 94.94 | SFPL53(OHARA) |
| 9 | −9.000 | 1.00 | 1.71736 | 29.52 | STIH1(OHARA) |
| 10 | −18.032 | 0.20 | | | |
| 11 | 20.912 | 1.00 | 1.71736 | 29.52 | STIH1(OHARA) |
| 12 | 8.886 | 2.34 | 1.60300 | 65.44 | SPHM53(OHARA) |
| 13 | −82.844 | variable (B) | | | |
| 14* | 21.208 | 1.25 | 1.51633 | 64.06 | LBSL7(OHARA) |
| 15 | 132.896 | variable (C) | | | |
| 16 | 0.000 | 1.24 | 1.50000 | 64.00 | |
| 17 | 0.000 | | | | |

"Aspherical" is the surface with a mark "*" in Table 1 and is the same as in the following examples.

The 4th face

K=−0.82391,

A4=8.44238E−05,

A6=−1.00402E−05,

A8=2.96784E−07,

A10=−1.02358E−08

The 6th face

A4=3.19453E−05,

A6=−1.90098E−06,

A8=1.59520E−07,

A10=−4.45055E−09

The 14th face

K=−26.92849,

A4=−1.76448E−05,

A6=−8.17352E−06,

A8=6.90928E−0.8,

A10=−1.17272E−09

For example, "−1.17272E-09" means "$-1.17272 \times 10^{-9}$". This is the same as in the following examples. Moreover, "glass" means a glass material, and the details in brackets refer to manufacturer's specifications.

"Air Interval"

A change of the air interval following focusing is illustrated in Table 2.

TABLE 2

|   | Inf. | 300 mm | 125 mm |
|---|---|---|---|
| A | 4.19 | 4.03 | 3.84 |
| B | 3.45 | 3.58 | 3.68 |
| C | 5.37 | 5.40 | 5.49 |

"The Parameter Values in Conditional Expressions"

The parameter values in conditional expressions are illustrated in Table 3.

TABLE 3

| D_S2/f | 0.699 |
|---|---|
| f2a/f2b | 0.390 |
| f2a/f1 | 0.509 |
| D2_b/D2_a | 0.343 |

Figure 5:
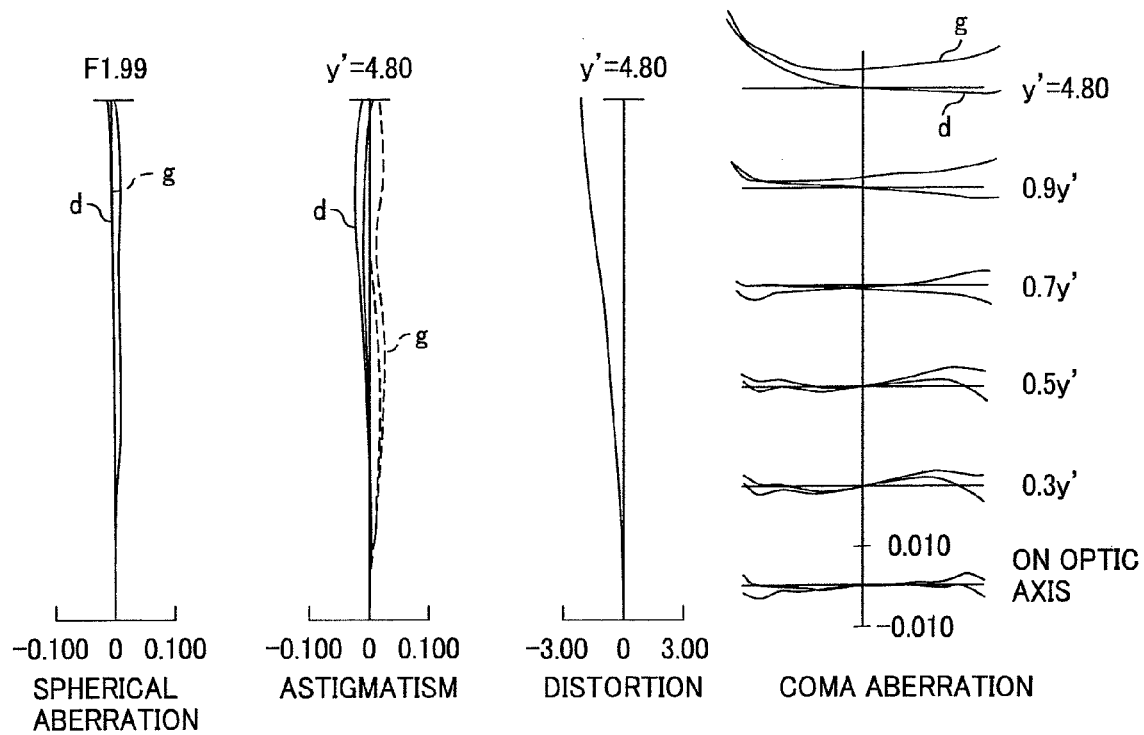
FIG. 5 is an aberration curve chart of an "infinity-distance object" of the optical imaging system of the first embodiment.
Figure 6:
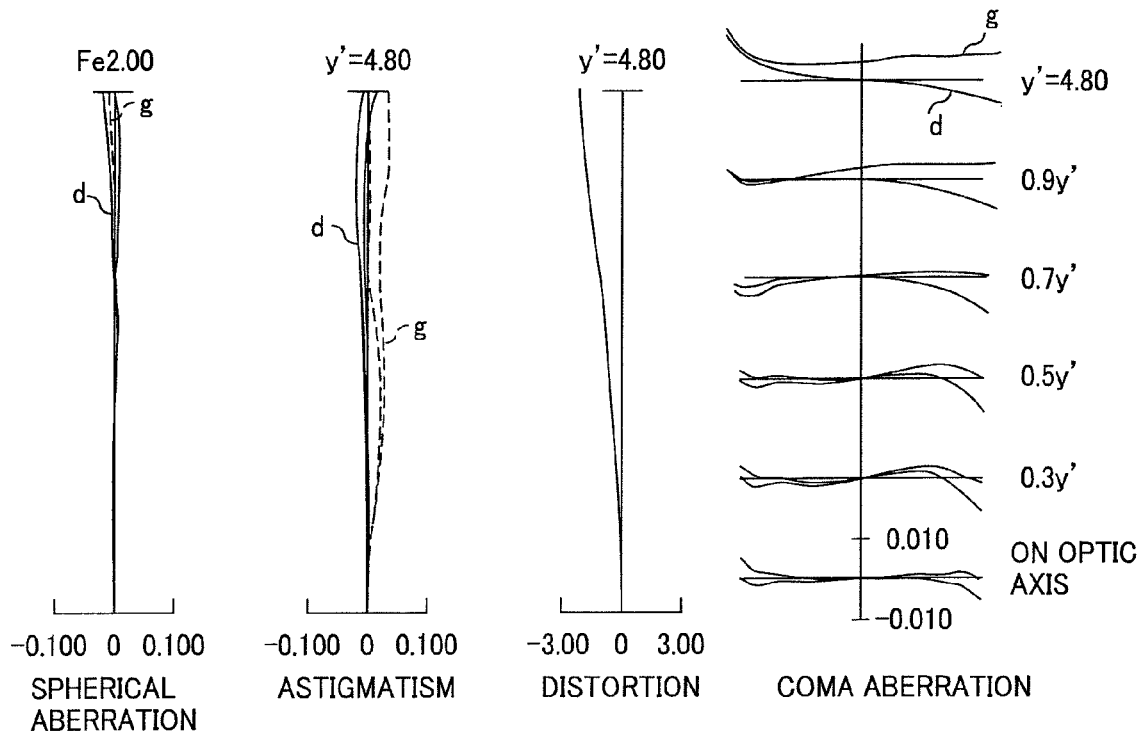
FIG. 6 is an aberration curve chart of an "object at the distance of 300 mm from a most object side" of the optical imaging system of the first embodiment.
Figure 7:
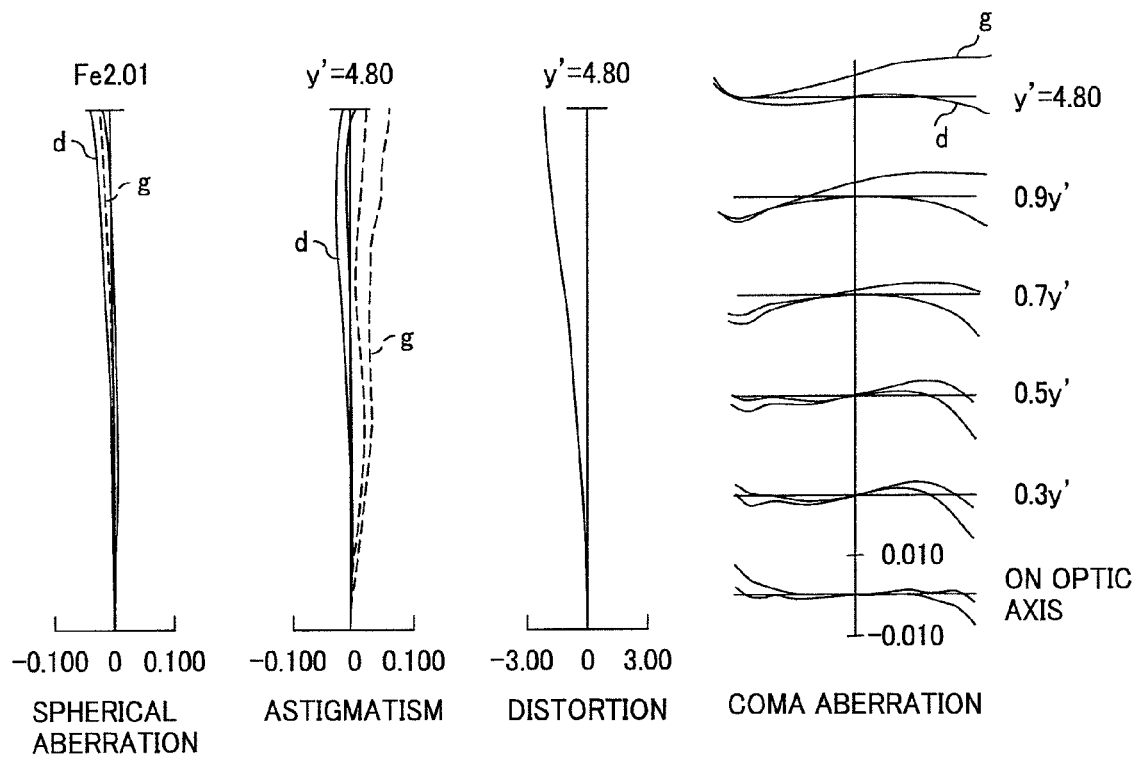
FIG. 7 is an aberration curve chart of the "object at the distance of 125 mm from the most object side" of the optical imaging system of the first embodiment.

FIGS. 5, 6 and 7 illustrate the aberration curve chart of example 1. FIG. 5 is the aberration curve chart when "focusing to infinity", FIG. 6 is the aberration curve chart when "focusing from the lens closest to an object side to an object at the distance of 300 mm", FIG. 7 is the aberration curve chart when "focusing from the lens closest to an object side to an object at the distance of 125 mm".

The broken line of spherical aberration illustrates the sine condition, the real line of astigmatism in the drawings illustrates sagittal, and the broken line illustrates meridional. "d" is the aberration curve chart of d line, "g" is the aberration curve chart of g line. These are similarly used in the following aberration curve chart.

Example 2

Figure 2:
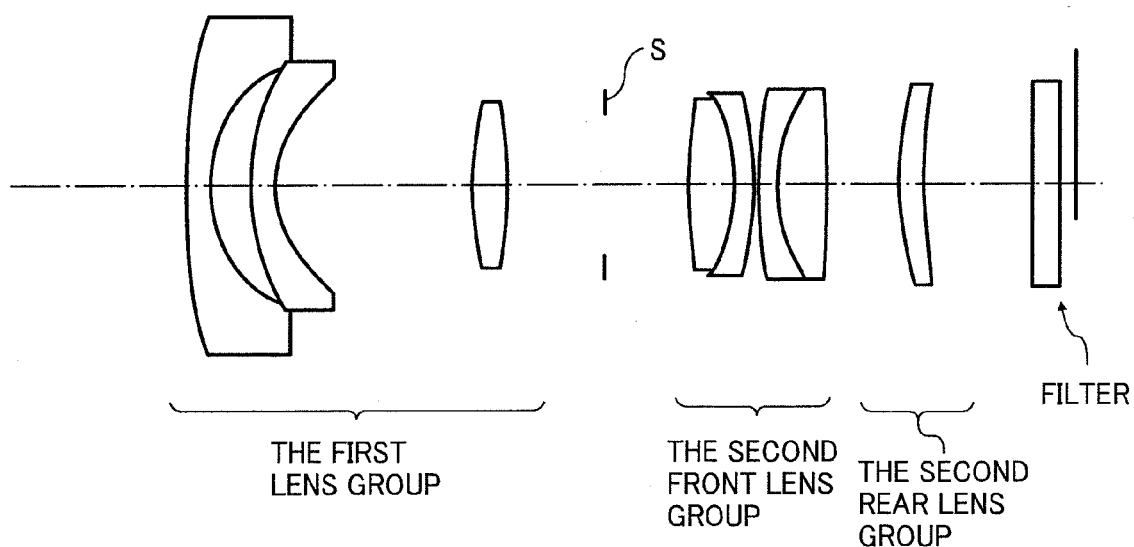
FIG. 2 is an optical arrangement chart of a second embodiment of the imaging optical system according to the present invention.

FIG. 2 illustrates a lens constitution of Example 2.

f=5.98; F=2.03; ω=39.3; Y'=4.8

The data of Example 2 is illustrated in Table 4.

TABLE 4

|    | R       | D           | N       | ν     | glass        |
|----|---------|-------------|---------|-------|--------------|
| 1  | 30.355  | 1.20        | 1.43875 | 94.94 | SFPL53(OHARA) |
| 2  | 6.700   | 2.29        |         |       |              |
| 3  | 13.832  | 1.20        | 1.51633 | 64.06 | LBSL7(OHARA) |
| 4* | 5.000   | 9.48        |         |       |              |
| 5  | 18.805  | 1.79        | 1.69350 | 53.18 | LLAL13(OHARA) |
| 6* | -27.648 | 4.99        |         |       |              |
| 7  | 0.000   | variable (A) |         |       |              |
| 8  | 26.537  | 2.19        | 1.43875 | 94.94 | SFPL53(OHARA) |
| 9  | -9.000  | 1.00        | 1.71736 | 29.52 | STIH1(OHARA) |
| 10 | -20.855 | 0.20        |         |       |              |
| 11 | 23.697  | 1.00        | 1.71736 | 29.52 | STIH1(OHARA) |
| 12 | 10.430  | 2.39        | 1.60300 | 65.44 | SPHM53(OHARA) |
| 13 | -28.971 | variable (B) |         |       |              |
| 14*| 15.605  | 1.21        | 1.51633 | 64.06 | LBSL7(OHARA) |
| 15 | 33.725  | variable (C) |         |       |              |
| 16 | 0.000   | 1.24        | 1.50000 | 64.00 |              |
| 17 | 0.000   |             |         |       |              |

"Aspherical"

The 4th face $K=-0.82391$, $A4=3.31963E-05$, $A6=-2.95366E-06$, $A8=-1.27633E-07$, $A10=-1.85327E-09$ The 6th face $A4=2.42187E-05$, $A6=-1.63597E-06$, $A8=1.14965E-07$, $A10=-2.86332E-09$ The 14th face $K=-26.92849$, $A4=4.83215E-04$, $A6=-2.95824E-05$, $A8=7.23757E-07$, $A10=-1.04774E-08$ "Air Interval"

A change of the air interval following focusing is illustrated in Table 5.

TABLE 5

|   | Inf. | 300 mm | 125 mm |
|---|------|--------|--------|
| A | 3.96 | 3.80   | 3.60   |
| B | 3.42 | 3.58   | 3.71   |
| C | 5.52 | 5.52   | 5.59   |

"The Parameter Values in Conditional Expressions"

The parameter values in conditional expressions are illustrated in Table 6.

TABLE 6

| D_S2/f    | 0.662 |
| f2a/f2b   | 0.314 |
| f2a/f1    | 0.324 |
| D2_b/D2_a | 0.194 |

Figure 8:
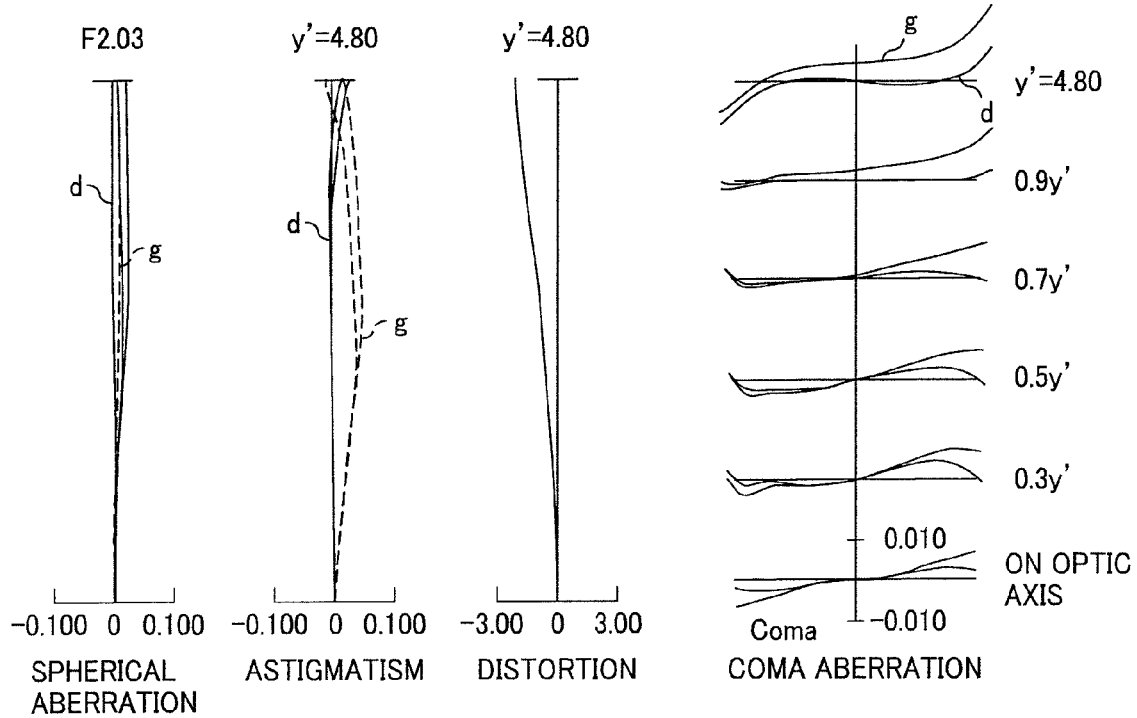
FIG. 8 is an aberration curve chart of an "infinity-distance object" of the optical imaging system of the second embodiment.
Figure 9:
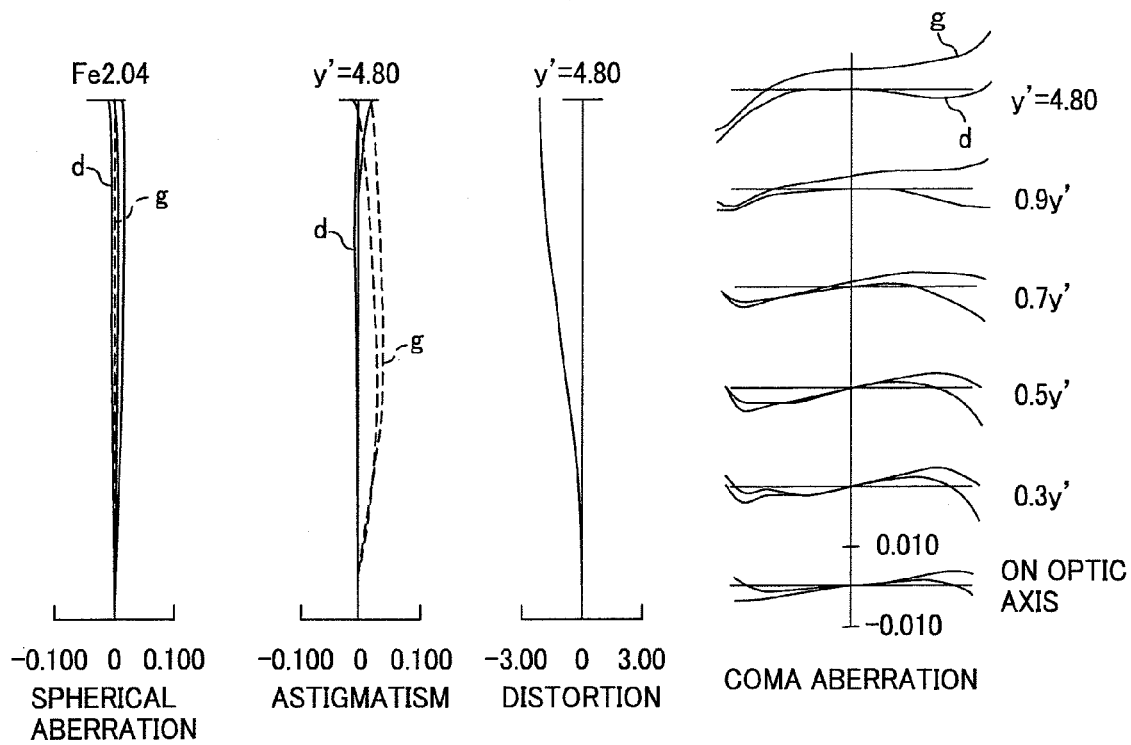
FIG. 9 is an aberration curve chart of an "object at the distance of 300 mm from a most object side" of the optical imaging system of the second embodiment.
Figure 10:
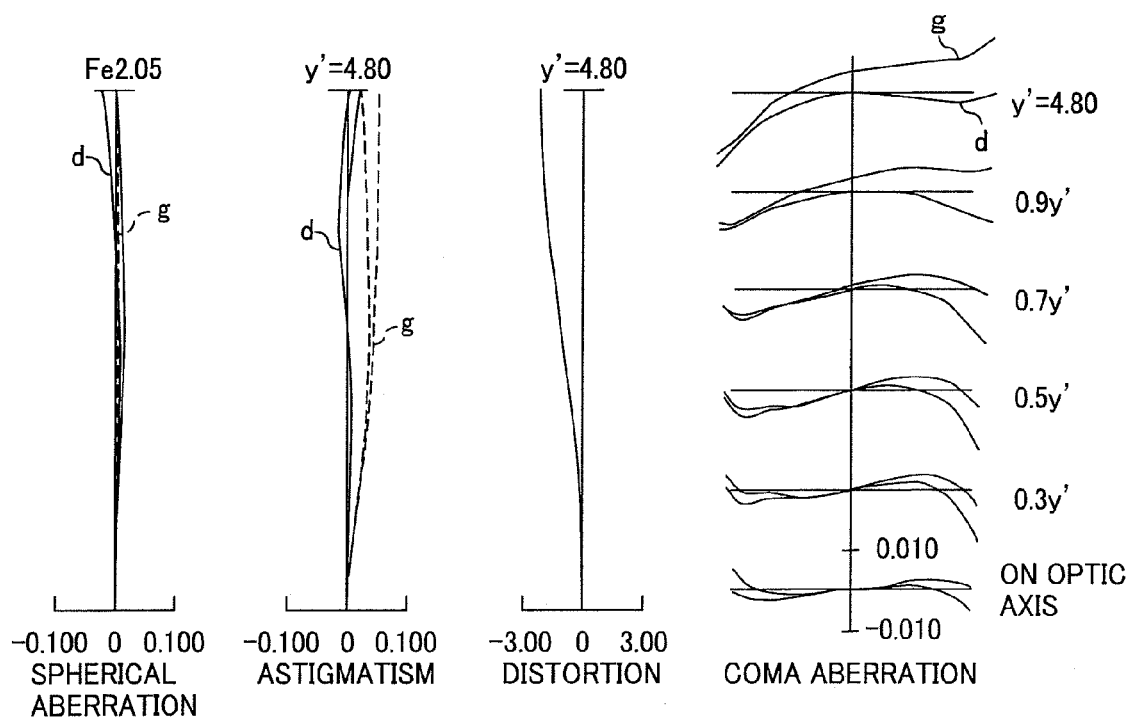
FIG. 10 is an aberration curve chart of the "object at the distance of 125 mm from the most object side" of the optical imaging system of the second embodiment.

FIGS. 8, 9 and 10 illustrate the aberration curve chart of Example 2. FIG. 8 is the aberration curve chart when "focusing to infinity", FIG. 9 is the aberration curve chart when "focusing from the lens closest to an object side to an object at the distance of 300 mm", FIG. 10 is the aberration curve chart when "focusing from the lens closest to an object side to an object at the distance of 125 mm".

Example 3

Figure 3:
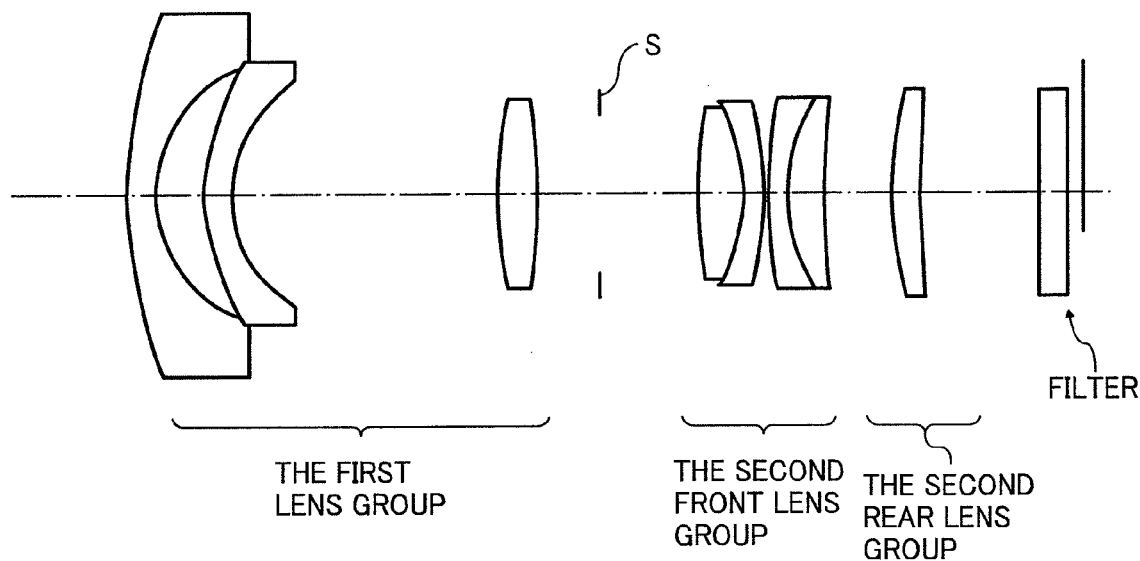
FIG. 3 is an optical arrangement chart of a third embodiment of the imaging optical system according to the present invention.

FIG. 3 illustrates a lens constitution of Example 3.

f=6.00; F=2.00; ω=39.3; Y'=4.8

The data of Example 3 is illustrated in Table 7.

TABLE 7

|    | R        | D            | N       | ν     | glass         |
|----|----------|--------------|---------|-------|---------------|
| 1  | 20.824   | 1.20         | 1.48749 | 70.24 | SFSL5(OHARA)  |
| 2  | 6.600    | 2.57         |         |       |               |
| 3  | 12.330   | 1.30         | 1.51633 | 64.06 | LBSL7(OHARA)  |
| 4* | 5.000    | 12.59        |         |       |               |
| 5  | 17.987   | 1.91         | 1.69350 | 53.18 | LLAL13(OHARA) |
| 6* | -23.878  | 2.91         |         |       |               |
| 7  | 0.000    | variable (A) |         |       |               |
| 8  | 22.218   | 2.18         | 1.49700 | 81.54 | SFPL51(OHARA) |
| 9  | -9.000   | 1.00         | 1.74077 | 27.79 | STIH13(OHARA) |
| 10 | -23.201  | 0.20         |         |       |               |
| 11 | 42.638   | 1.00         | 1.69895 | 30.13 | STIM35(OHARA) |
| 12 | 9.802    | 1.83         | 1.60300 | 65.44 | SPHM53(OHARA) |
| 13 | 86.769   | variable (B) |         |       |               |
| 14*| 14.672   | 1.59         | 1.51633 | 64.06 | LBSL7(OHARA)  |
| 15 | -945.947 | variable (C) |         |       |               |
| 16 | 0.000    | 1.24         | 1.50000 | 64.00 |               |
| 17 | 0.000    |              |         |       |               |

"Aspherical"

The 4th face $K=-0.82391$, $A4=8.59739E-05$, $A6=-2.45827E-06$, $A8=-4.32075E-08$, $A10=-6.11565E-09$ The 6th face $A4=3.08020E-05$, $A6=-6.69703E-07$, $A8=5.33652E-08$, $A10=-1.27280E-09$ The 14th face $K=-26.92849$, $A4=-6.08330E-04$, $A6=-3.50862E-05$,

A8=9.30982E-07,

A10=−1.32309E-08

"Air Interval"

A change of the air interval following focusing is illustrated in Table 8.

TABLE 8

|   | Inf. | 300 mm | 125 mm |
|---|------|--------|--------|
| A | 4.58 | 4.33   | 4.09   |
| B | 2.92 | 3.12   | 3.25   |
| C | 5.54 | 5.59   | 5.70   |

"The Parameter Values in Conditional Expressions"

The parameter values in conditional expressions are illustrated in Table 9.

TABLE 9

| D_S2/f   | 0.763 |
|----------|-------|
| f2a/f2b  | 1.300 |
| f2a/f1   | 2.115 |
| D2_b/D2_a | 0.327 |

Figure 11:
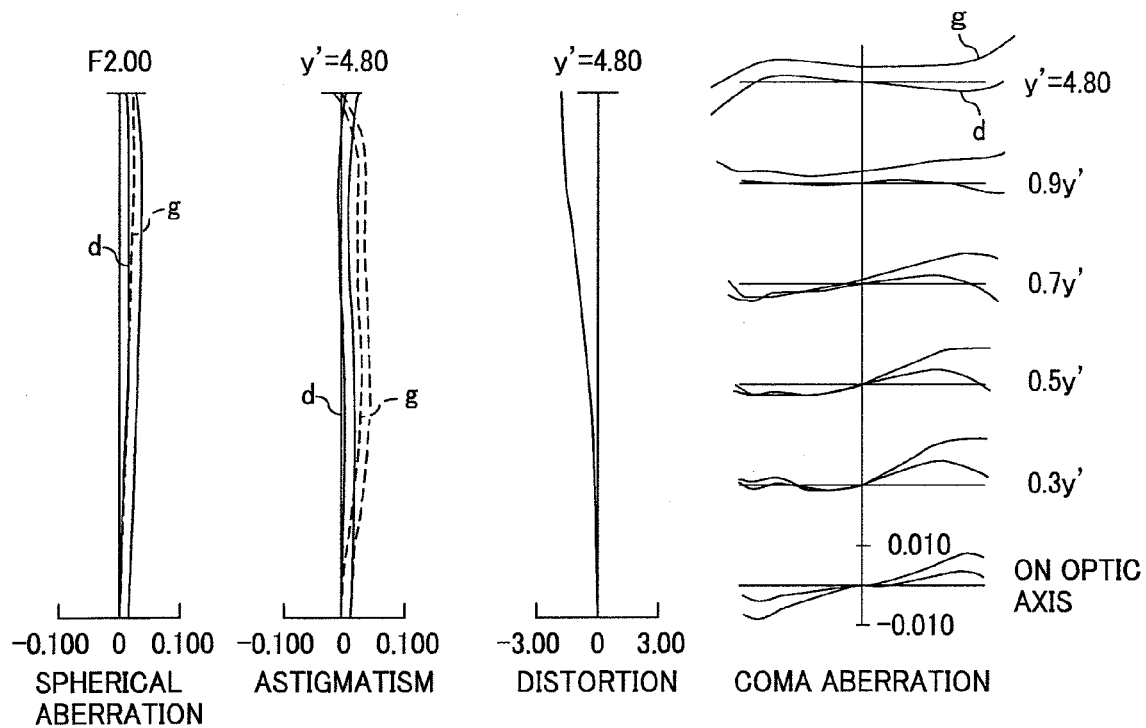
FIG. 11 is an aberration curve chart of an "infinity-distance object" of the optical imaging system of the third embodiment.
Figure 12:
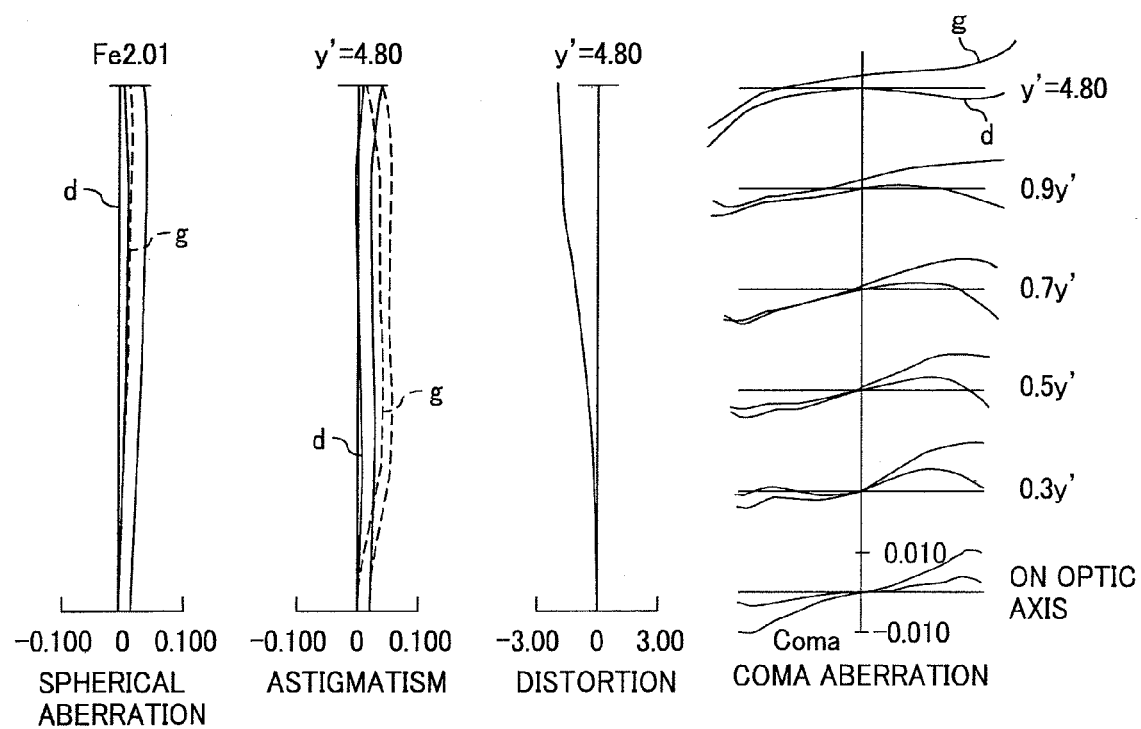
FIG. 12 is an aberration curve chart of an "object at the distance of 300 mm from a most object side" of the optical imaging system of the third embodiment.
Figure 13:
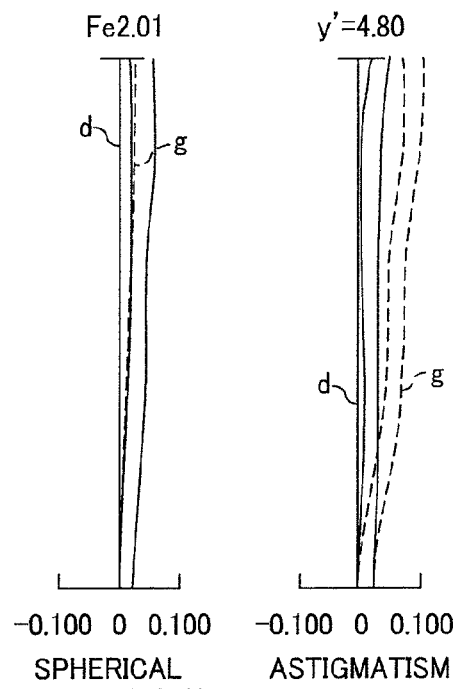
FIG. 13 is an aberration curve chart of the "object at the distance of 125 mm from the most object side" of the optical imaging system of the third embodiment.
Figure 13:
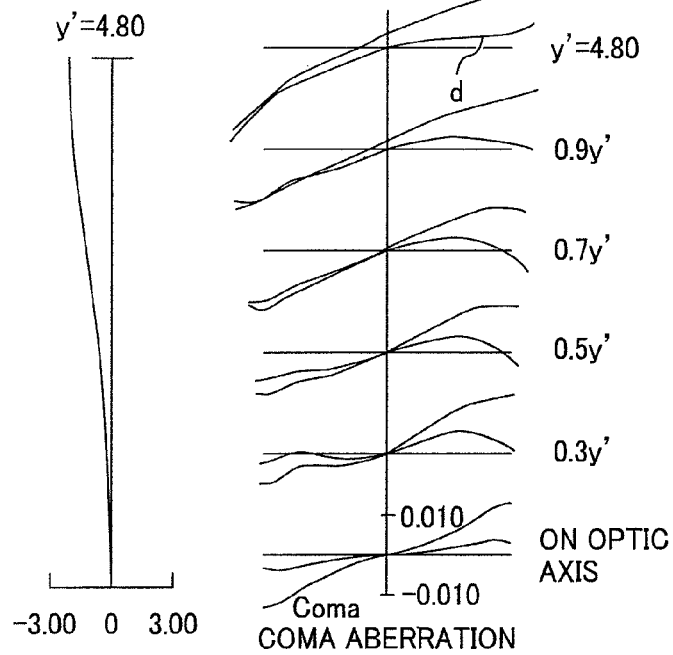

FIGS. 11, 12 and 13 illustrate the aberration curve chart of Example 3. FIG. 11 is the aberration curve chart when "focusing to infinity", FIG. 12 is the aberration curve chart when "focusing from the lens closest to an object side to an object at the distance of 300 mm", FIG. 13 is the aberration curve chart when "focusing from the lens closest to an object side to an object at the distance of 125 mm".

Example 4

Figure 4:
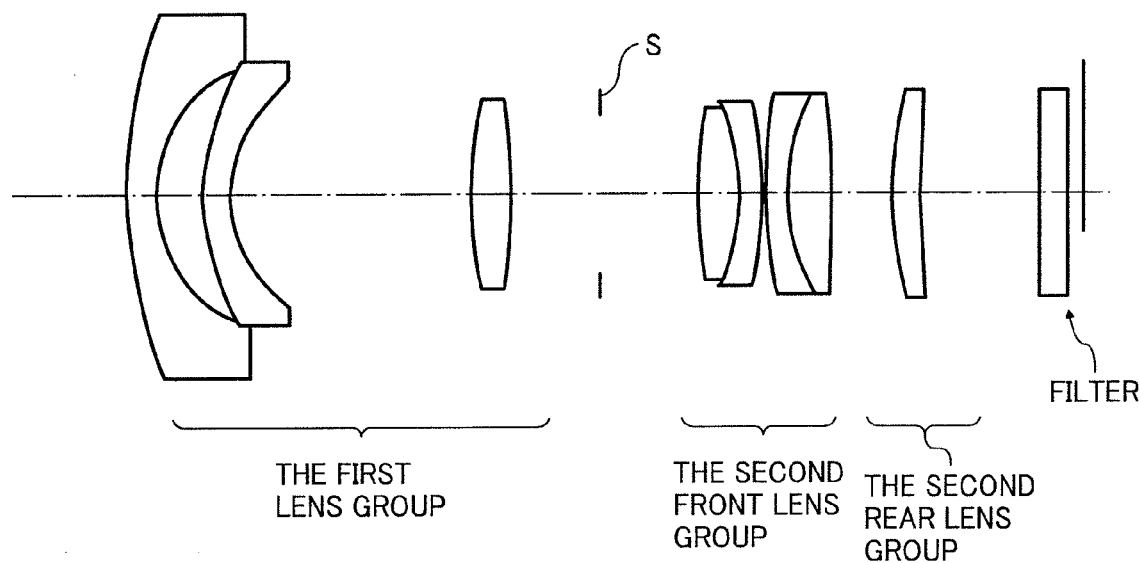
FIG. 4 is an optical arrangement chart of a fourth embodiment of the imaging optical system according to the present invention.

FIG. 4 illustrates a lens constitution of Example 4.

f=6.00; F=1.95; ω=39.1; Y'=4.8

The data of Example 4 is illustrated in Table 10.

TABLE 10

|    | R       | D          | N       | ν     | glass       |
|----|---------|------------|---------|-------|-------------|
| 1  | 22.824  | 1.20       | 1.48749 | 70.24 | SFSL5(OHARA) |
| 2  | 6.600   | 2.27       |         |       |             |
| 3  | 11.856  | 1.28       | 1.51633 | 64.06 | LBSL7(OHARA) |
| 4* | 5.000   | 11.53      |         |       |             |
| 5  | 18.323  | 1.81       | 1.69350 | 53.18 | LLAL13(OHARA) |
| 6* | −26.515 | 4.31       |         |       |             |
| 7  | 0.000   | variable (A) |       |       |             |
| 8  | 43.943  | 1.99       | 1.49700 | 81.54 | SFPL51(OHARA) |
| 9  | −9.000  | 1.00       | 1.74077 | 27.79 | STIH13(OHARA) |
| 10 | −32.779 | 0.20       |         |       |             |
| 11 | 19.707  | 1.00       | 1.69895 | 30.13 | STIM35(OHARA) |
| 12 | 9.972   | 2.28       | 1.60300 | 65.44 | SPHM53(OHARA) |
| 13 | −36.934 | variable (B) |       |       |             |
| 14* | 15.450 | 1.26       | 1.51633 | 64.06 | LBSL7(OHARA) |
| 15 | 37.405  | variable (C) |       |       |             |
| 16 | 0.000   | 1.24       | 1.50000 | 64.00 |             |
| 17 | 0.000   |            |         |       |             |

"Aspherical"

The 4th face

K=−0.82391,

A4=7.26169E-05,

A6=−5.10959E-06,

A8=4.38244E-08,

A10=−6.97612E-09

The 6th face

A4=2.05935E-05,

A6=−1.04777E-06,

A8=8.84156E-08,

A10=−2.25119E-09

The 14th face

K=−26.92849,

A4=5.11073E-04,

A6=−2.92185E-05,

A8=7.49033E-07,

A10=−1.06280E-08

"Air Interval"

A change of the air interval following focusing is illustrated in Table 11.

TABLE 11

|   | Inf. | 300 mm | 125 mm |
|---|------|--------|--------|
| A | 4.61 | 4.33   | 4.20   |
| B | 2.87 | 3.04   | 3.24   |
| C | 5.72 | 5.73   | 5.76   |

"The Parameter Values in Conditional Expressions"

The parameter values in conditional expressions are illustrated in Table 12.

TABLE 12

| D_S2/f   | 0.768 |
|----------|-------|
| f2a/f2b  | 0.390 |
| f2a/f1   | 0.509 |
| D2_b/D2_a | 0.098 |

Figure 14:
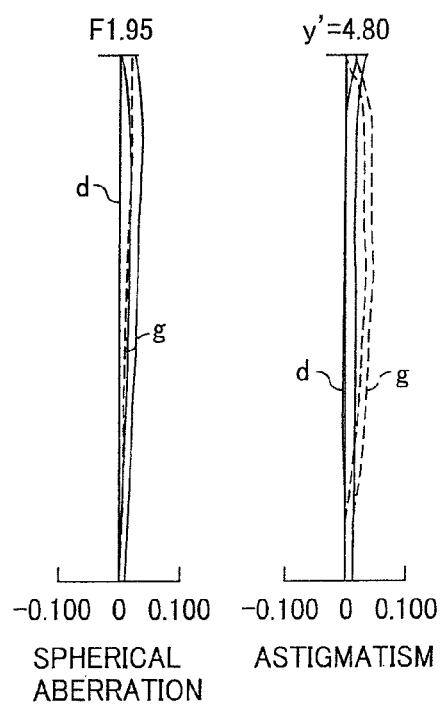
FIG. 14 is an aberration curve chart of an "infinity-distance object" of the optical imaging system of the fourth embodiment.
Figure 14:
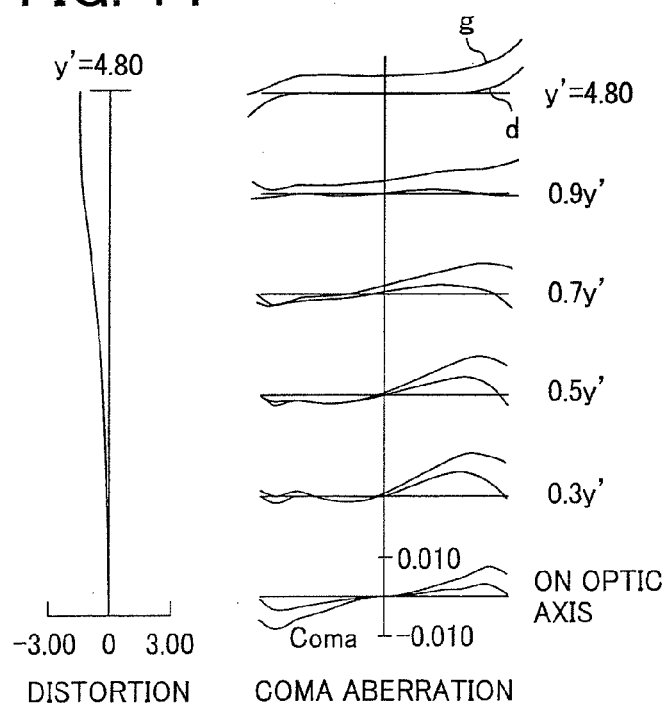
Figure 15:
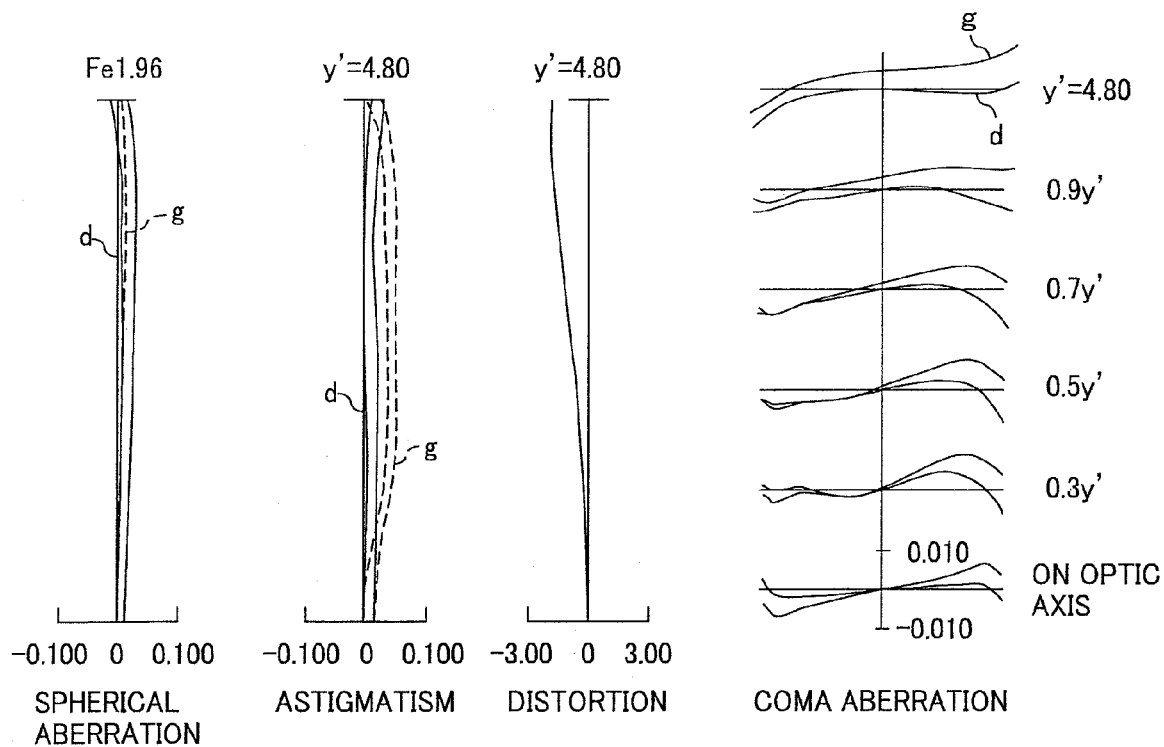
FIG. 15 is an aberration curve chart of an "object at the distance of 300 mm from a most object side" of the optical imaging system of the fourth embodiment.
Figure 16:
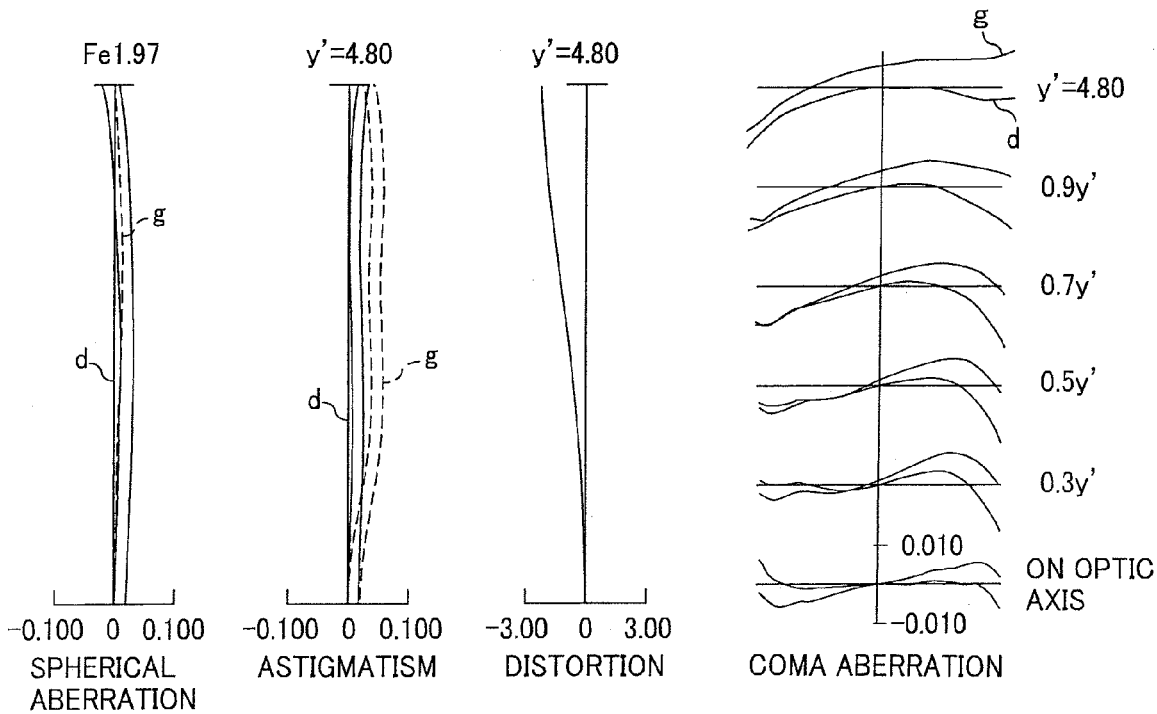
FIG. 16 is an aberration curve chart of the "object at the distance of 125 mm from the most object side" of the optical imaging system of the fourth embodiment.

FIGS. 14, 15 and 16 illustrate the aberration curve chart of Example 4. FIG. 14 is the aberration curve chart when "focusing to infinity", FIG. 15 is the aberration curve chart when "focusing from the lens closest to an object side to an object at the distance of 300 mm", FIG. 16 is the aberration curve chart when "focusing from the lens closest to an object side to an object at the distance of 125 mm".

Each of the examples is capable of amending aberration sufficiently, ensuring a wide angle of field of a half-field angle exceeding 38 degrees and a large caliber with the F number of 2.1 or less, and miniaturizing and ensuring higher image performance at a short-distance.

As mentioned above, the present invention is capable of providing a new type of imaging optical system (imaging lens system). As mentioned in the examples, the imaging optical system according to the present invention achieves an imaging optical system with a high performance capable of corresponding to an imaging element exceeding ten million pixels, a wide angle of field with a half-field angle exceeding 38 degrees, a large caliber with the F number of 2.1 or less, a high performance even to a short-distanced object in which a strong driving force is not required for focusing. The present invention provides a miniature camera apparatus using the imaging optical system and a personal digital assistant using the camera apparatus with high performance by equipping with the correlative imaging element.

It should be noted that although the present invention has been described with respect to the exemplary examples, the invention is not limited thereto. In view of the foregoing, it is intended that the present invention cover modifications and variations provided they fall within the scope of the following claims and their equivalent.

What is claimed is:

1. An imaging optical system, comprising:
a first lens group;
an aperture stop; and
a second lens group having a positive power, the first lens group, the aperture stop and the second lens group being arranged from a side of an object sequentially,
wherein the second lens group includes a second front lens group having a positive power and a second rear lens group having a positive power, the second front lens group and the second rear lens group being arranged sequentially from the object side,
wherein, when focusing from an infinity-distance object to a short-distance object, the first lens group and the aperture stop are fixed, and the second front lens group and the second rear lens group are moved with a mutually different movement amount,
wherein when focusing from the infinity-distance object to the short-distance object, the second front lens group and the second rear lens group are moved to the object side, and
wherein a conditional expression is satisfied: (1) $0.2 < DS2/f < 1.5$, wherein D S2 is an interval between the aperture stop at the time of focusing to infinity and the second lens group, f is a focal length of the entire system.

2. The imaging optical system according to claim 1, wherein a conditional expression is satisfied: (2) $0.1 < f2a/f2b < 3.0$, wherein f2a is a focal length of the second front lens group, f2b is a focal length of the second rear lens group.

3. The imaging optical system according to claim 1, wherein the first lens group has a positive power.

4. The imaging optical system according to claim 1, wherein a conditional expression is satisfied: (3) $0.1 < f2a/f1 < 3.0$, wherein f1 is a focal length of the first lens group, f2a is a focal length of the second front lens group.

5. The imaging optical system according to claim 1, wherein an interval between the second front lens group and the second rear lens group is increased at the time of focusing from an infinity-distance object to a short-distance object.

6. The imaging optical system according to claim 1, wherein a conditional expression is satisfied: (4) $0.05 < D2\_b/D2\_a < 0.7$, wherein Y' is the highest image, f is a focal length of the entirety of the system, D2_a is a movement amount of the second front lens group at the time of focusing from an infinity-distance object to the object remote from a lens of the object side by a distance of $(100 \times f/Y')$ mm, D2_b is a movement amount of the second rear lens group.

7. The imaging optical system according to claim 1, wherein a conditional expression is satisfied: (4) $0.05 < D2\_b/D2\_a < 0.7$, wherein Y' is the highest image, f is a focal length of the entirety of the system, D2_a is a movement amount of the second front lens group at the time of focusing from an infinity-distance object to the object remote from a lens of the object side by a distance of $(100 \times f/Y')$ mm, D2_b is a movement amount of the second rear lens group.

8. The imaging optical system according to claim 1, wherein the second front lens group is arranged from an object side sequentially in an order of a positive lens, a negative lens, a negative lens, and a positive lens.

9. The imaging optical system according to claim 1, wherein the second front lens group is arranged from an object side sequentially in an order of a positive lens, a negative lens, a negative lens, and a positive lens.

10. The imaging optical system according to claim 1, wherein the second rear lens group is constituted by one positive lens.

11. A camera apparatus that includes the imaging optical system according to claim 1.

12. The camera apparatus according to claim 11, further comprising: an imaging element that images an image by the imaging optical system, wherein a function of converting an imaged image to digital information is included.

13. A personal digital assistant including the camera apparatus according to claim 12.

* * * * *